(12) United States Patent
Maiya (10) Patent No.: US 8,150,137 B2
(45) Date of Patent: Apr. 3, 2012

(54) IMAGE PROCESSING DEVICE, IMAGE PROCESSING PROGRAM, AND OBSERVATION SYSTEM

(75) Inventor: Nobuhiko Maiya, Yokohama (JP)

(73) Assignee: Nikon Corporation, Tokyo (JP)

( * ) Notice: Subject to any disclaimer, the term of this patent is extended or adjusted under 35 U.S.C. 154(b) by 542 days.

(21) Appl. No.: 12/385,786

(22) Filed: Apr. 20, 2009

(65) Prior Publication Data
US 2009/0226061 A1  Sep. 10, 2009

Related U.S. Application Data

(63) Continuation of application No. PCT/JP2007/001307, filed on Nov. 27, 2007.

(30) Foreign Application Priority Data

Dec. 1, 2006  (JP) ................................. 2006-325918

(51) Int. Cl.
*G06K 9/00*  (2006.01)
(52) U.S. Cl. ...................................... 382/133
(58) Field of Classification Search ........................ None
See application file for complete search history.

(56) References Cited

U.S. PATENT DOCUMENTS

| | | | | |
|---|---|---|---|---|
| 7,194,124 B2* | 3/2007 | Soll et al. | ........................ | 382/133 |
| 7,817,841 B2* | 10/2010 | Padfield et al. | ................. | 382/133 |
| 7,822,257 B2* | 10/2010 | Endo et al. | .................... | 382/133 |
| 2004/0004614 A1 | 1/2004 | Bacus et al. | | |
| 2004/0022449 A1 | 2/2004 | Olschewski | | |
| 2005/0068614 A1 | 3/2005 | Yoneyama et al. | | |
| 2006/0176367 A1 | 8/2006 | Endo et al. | | |
| 2006/0204236 A1 | 9/2006 | Sasaki et al. | | |
| 2008/0247628 A1* | 10/2008 | Ramsing et al. | ............... | 382/133 |
| 2009/0159814 A1 | 6/2009 | Maiya | | |
| 2009/0274360 A1* | 11/2009 | Suzuki et al. | .................. | 382/133 |

FOREIGN PATENT DOCUMENTS

| | | |
|---|---|---|
| JP | A-2005-518570 | 6/2005 |
| JP | A-2006-220904 | 8/2006 |
| WO | WO 98/31150 | 7/1998 |

(Continued)

OTHER PUBLICATIONS

Daniel Gerlich et al., Four-dimensional imaging and quantitative reconstruction to analyse complex spatiotemporal processes in live cells, nature Cell Biology, vol. 3, Sep. 2001, pp. 852-855, and supplementary pp. 1-2.*

(Continued)

*Primary Examiner* — Brian Werner
(74) *Attorney, Agent, or Firm* — Oliff & Berridge, PLC (57) ABSTRACT

It is a proposition to reduce user's burden when performing tracking observation of a specimen. Therefore, an image processing apparatus includes a storage unit which takes in a plurality of slice images acquired from a specific area of a specimen by each of Z-stack shootings performed at different time point, associates the plurality of slice images each with a shooting time point and slice height z, and stores the plurality of slice images as one of slice image groups, a manual selecting unit which allows user to manually select a representing image (Ia, Ib, Ic, . . . ) from one of slice image groups, and an automatic selecting unit which automatically selects a representing image from another one of slice image groups based on a result of the manual selection.

15 Claims, 6 Drawing Sheets

FOREIGN PATENT DOCUMENTS

WO    WO 03/073365 A1    9/2003

OTHER PUBLICATIONS

W. Tvarusko et al., Time-resolved analysis and visualization of dynamic processes in living cells, Proceedings of the National Academy of Sciences, Cell Biology, vol. 96, Jul. 1999, pp. 8950-7955.*

Sebastian Hakansson et al., Time-Lapse Video microscopy of Gliding Motility in *Toxoplasma gondii* Reveals a Novel, Biphasic mechanism of Cell Locomotion, Molecular Biology of the Cell, vol. 10, pp. 3539-3547, Nov. 1999.*

Nov. 21, 2011 European Search Report issued in European Patent Application No. 07828084.9.

* cited by examiner

IMAGE PROCESSING DEVICE, IMAGE PROCESSING PROGRAM, AND OBSERVATION SYSTEM

CROSS REFERENCE TO THE RELATED APPLICATIONS

This application is a continuation application of International Application PCT/JP2007/001307, filed Nov. 27, 2007, designating the U.S., and claims the benefit of priority from Japanese Patent Application No. 2006-325918, filed on Dec. 1, 2006, the entire contents of which are incorporated herein by reference.

BACKGROUND

1. Field

The present application relates to an image processing apparatus and an image processing program applied to an observing apparatus of incubating cells or the like. In addition, the present application relates to an observing system comprising an observing apparatus and an image processing apparatus.

2. Description of the Related Art

In order to observe temporal change of incubating cells, time-lapse shooting (see Patent Document 1: Japanese Unexamined Patent Application Publication No. 2006-220904, etc.) is effective, which performs shooting multiple times at a constant time interval. Additionally, in order to observe the situation along the depth direction of the incubating cells, Z-stack shooting (see Patent Document 2: WO 2003/073365, etc.) is effective, which performs shooting multiple times while displacing the focal plane of the objective lens along the optical axis direction (z-direction).

By performing shooting in a combined manner of the both (Z-stack time-lapse shooting), failed capturing of an image can be prevented even if a specimen of the user's interest (e.g., specific organelle) is displaced along the depth direction in the course of shooting.

Typically, slice image groups acquired in respective rounds of shooting are taken into a computer. The computer allows the user to select slice images which are in focus with the specimen of the user's interest, one by one from slice image groups of respective rounds. By concatenating the selected slice images in the order of rounds, a movie image file for tracking observation of the specimen can also be acquired.

However, the above-mentioned task of the user is very burdensome. For example, if the stack number is 30, the user needs to compare 30 slice images, and the user needs to repeat the comparison 100 times if the round number is 100.

Therefore, it is a proposition of the present application to provide an image processing apparatus and an image processing program which can reduce the user's burden when performing tracking observation of the specimen. In addition, it is also a proposition to provide a user friendly observing system.

SUMMARY

An image processing apparatus of the present embodiments includes a storage unit which takes in a plurality of slice images acquired from a specific area of a specimen by each of Z-stack shootings performed at different time point, associates the plurality of slice images each with a shooting time point and a slice height z of the shooting time point, and stores the plurality of slice images as one of slice image groups, a manual selecting unit which allows a user to manually select a slice image from one of slice image groups stored by the storage unit as a representing slice image of said one of slice image groups, and an automatic selecting unit which automatically selects a slice image from another one of slice image groups stored by the storage unit, as a representing slice image of said another one of slice image groups, based on a selecting standard information indicating a result of the manual selection.

Here, it is preferred that the selecting standard information includes stack coordinates (t, z) which indicate the shooting time point t and the slice height z of the manually selected slice image.

In addition, the number of said one of slice image groups is equal to or larger than two, and given the stack coordinates $(t_1, Z_1), (t_2, Z_2), \ldots$ of two or more slice images manually selected from two or larger number of said one of slice image groups, it is preferred that the stack coordinates (t', z') of the automatically selected slice image is located near a curve defined by the coordinates $(t_1, z_1), (t_2, Z_2), \ldots$ on the t-z plane.

It is preferred that the curve is a spline curve.

In addition, it is preferred that the selecting standard information includes a graphic pattern information of the manually selected slice image.

In addition, an image processing program of the present embodiments includes a storage operation which takes in a plurality of slice images acquired from a specific area of a specimen by each of Z-stack shootings performed at different time point, associates the plurality of slice images each with a shooting time points and a slice height z of the shooting time point, and stores the plurality of slice images as one of slice image groups, a manual selecting operation which allows a user to manually select a slice image from one of slice image groups stored by the storage operation as a representing slice image of said one of slice image groups, and an automatic selecting operation which automatically selects a slice image from another one of slice image groups stored by the storage operation, as a representing slice image of said another one of slice image groups, based on a selecting standard information indicating a result of the manual selection.

Here, it is preferred that the selecting standard information includes stack coordinates (t, z) which indicate the shooting time point t and the slice height z of the manually selected slice image.

In addition, the number of said one of slice image groups is equal to or larger than two, and given the stack coordinates $(t_1, Z_1), (t_2, Z_2), \ldots$ of two or more slice images manually selected from two or larger number of said one of slice image groups, it is preferred that the stack coordinates (t', z') of the automatically selected slice image is located near a curve defined by the coordinates $(t_1, Z_1), (t_2, Z_2), \ldots$ on the t-z plane.

It is preferred that the curve is a spline curve.

In addition, it is preferred that the selecting standard information includes a graphic pattern information of the manually selected slice image.

In addition, an observing system of the present embodiments is characterized in that it includes an observing apparatus which acquires a plurality of slice images from a specific area of a specimen by each of Z-stack shootings performed at different time point, and any of the image processing apparatuses of the present embodiments.

According to the present application, an image processing apparatus and an image processing program which can reduce the user's burden when performing tracking observation of the specimen. Additionally, a user friendly observing system can be realized.

DETAILED DESCRIPTION OF THE EMBODIMENTS

[Embodiments]

An embodiment of the present application will be described. The present embodiment is an embodiment of a microscope system.

First, the configuration of a microscope system will be described.

Figure 1:
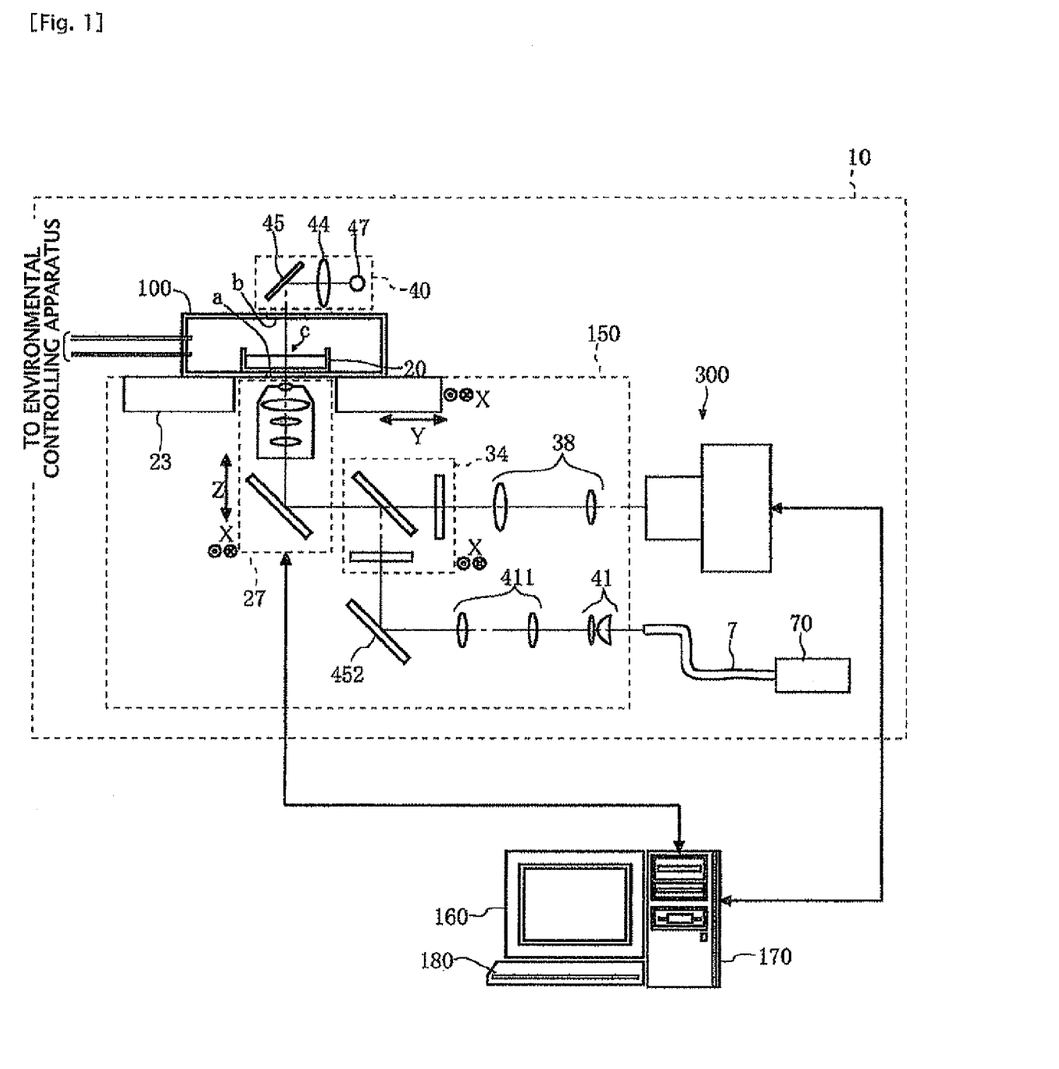
FIG. 1 illustrates a configuration of a microscope system.

FIG. 1 illustrates the configuration of a microscope system. As shown in FIG. 1, the microscope system includes an apparatus body 10, a computer 170, a monitor 160, and an input device 180. The apparatus body 10 includes a microscope part 150, a diascopic illumination part 40, a cooled camera 300, an excitation light source 70, and an optical fiber 7.

The microscope part 150 includes a stage 23, an objective lens part 27, a fluorescence filter part 34, an image-forming lens 38, a deflecting mirror 452, a field lens 411, and a collector lens 41, and the diascopic illumination part 40 includes a light source for diascopic illumination 47, a field lens 44, and a deflecting mirror 45.

A chamber 100 containing a transparent incubation container 20 is mounted on the stage 23. The incubation container 20 is filled with culture, in which incubating cells labeled by fluorescent material are growing. In order to observe the incubating cells from outside the chamber 100, a part a of the bottom surface of the chamber 100 and a part b of the top surface of the chamber 100 are made transparent, respectively. Although description is provided for a case in which the top surface of the incubation container 20 is opened, for simplicity, the top surface of the incubation container 20 may be covered with a lid made of a same material as the incubation container 20.

A plurality of types of objective lens are attached to the objective lens part 27 along the X-direction of FIG. 1, wherein the type of the objective lens disposed in the light path of the apparatus body 10 is switched when the objective part 27 is driven along the X-direction by a mechanism (not shown). The switching is performed under control of the computer 170.

A plurality of types of filter blocks are attached to the fluorescence filter part 34 along the X-direction of FIG. 1, wherein the type of the filter block disposed in the light path of the apparatus body 10 is switched when the fluorescence filter part 34 is driven along the X-direction by a mechanism (not shown). The switching is also performed under control of the computer 170.

The computer 170 switches the combination of the type of the objective lens disposed in the light path and the type of the filter block disposed in the light path, according to the observation technique which should be set in the apparatus body 10. In the following, it is assumed that the observation technique of the apparatus body 10 is switched between phase contrast observation and two types of fluorescence observation by the above-mentioned switching.

Here, the type of the filter block disposed in the light path and the type of the objective lens disposed in the light path are both different between phase contrast observation and fluorescence observation, whereas only the type of the filter block disposed in the path is different between the two types of fluorescence observation. In addition, the lighting method is also different between phase contrast observation and fluorescence observation.

The computer 170 turns on the light source for diascopic illumination 47 in order to make the light path of the diascopic illumination part 40 effective at the time of phase contrast observation, and turns on the excitation light source 70 in order to make the light path of the epi-illumination part (light path which passes through the excitation light source 70, the optical fiber 7, the collector lens 41, the field lens 411, the deflecting mirror 452, the fluorescence filter part 34, and the objective lens part 27, in sequence) at the time of fluorescence observation. Here, the excitation light source 70 is turned off when the light source for diascopic illumination 47 is turned on, and the light source for diascopic illumination 47 is turned off when the excitation light source 70 is turned on.

The light emitted from the light source for diascopic illumination 47 at the time of phase contrast observation illuminates the observing point c in the incubation container 20 via the field lens 44, the deflecting mirror 45, and the transparent part b of the chamber 100. The light which transmitted through the observing point c reaches the light receiving surface of the cooled camera 300 via the bottom surface of the incubation container 20, the transparent part a of the chamber 100, the objective lens part 27, the fluorescence filter part 34, the image-forming lens 38 to form a phase contrast image of the observing point c. When the cooled camera 300 is driven in this condition, the phase contrast image is captured to generate image data. The image data (image data of the phase contrast image) is taken into the computer 170.

At the time of fluorescence observation, the light emitted from the excitation light source 70 illuminates the observing point c in the incubation container 20 via the optical fiber 7, the collector lens 41, the field lens 411, the deflecting mirror 452, the fluorescence filter part 34, the objective lens part 27, the transparent part a of the chamber 100, and the bottom surface of the incubation container 20, whereby fluorescent material existing at the observation point c is activated to emit fluorescence. The fluorescence reaches the light receiving surface of the cooled camera 300 via the bottom surface of the incubation container 20, the transparent part a of the chamber 100, the objective lens part 27, the fluorescence filter part 34, and the image-forming lens 38 to form a fluorescent image of the observing point c. When the cooled camera 300 is driven in this condition, the fluorescent image is captured to generate image data. The image data (image data of fluorescence image) is taken into the computer 170.

Here, the computer 170 controls the XYZ coordinates of the observing point c in the incubation container 20 by controlling the XY coordinates of the stage 23 and the position of observation by the objective lens part 27 (Z-coordinate) along the optical axis direction.

In addition, an environmental controlling apparatus (not shown) is coupled to the chamber 100 via a silicon tube, whereby humidity and $CO_2$ density inside the chamber 100 are controlled to be close to a predefined value, respectively.

In addition, ambient atmosphere around the chamber 100 is suitably circulated by a heat exchanger (not shown), whereby temperature inside the chamber 100 is also controlled to be close to a predefined value. Such humidity, $CO_2$ density, and temperature of the chamber 100 are monitored by the computer 170 via a sensor (not shown). On the other hand, the cooled camera 300 is accommodated in a cabinet which is different from other parts of the apparatus body 10, and is kept almost equally to the temperature outside the apparatus body 10, regardless of the temperature inside the chamber 100.

In addition, a program for observation is installed in the computer 170 beforehand, and the computer 170 operates according to the program. The program for observation includes a program with regard to Z-stack time-lapse shooting described below and a program with regard to generation of a movie image file for tracking observation.

Next, operation of the computer 170 with regard to Z-stack time-lapse shooting will be described. Here, any input of information to the computer 170 by the user is performed via the input device 180.

Figure 2:
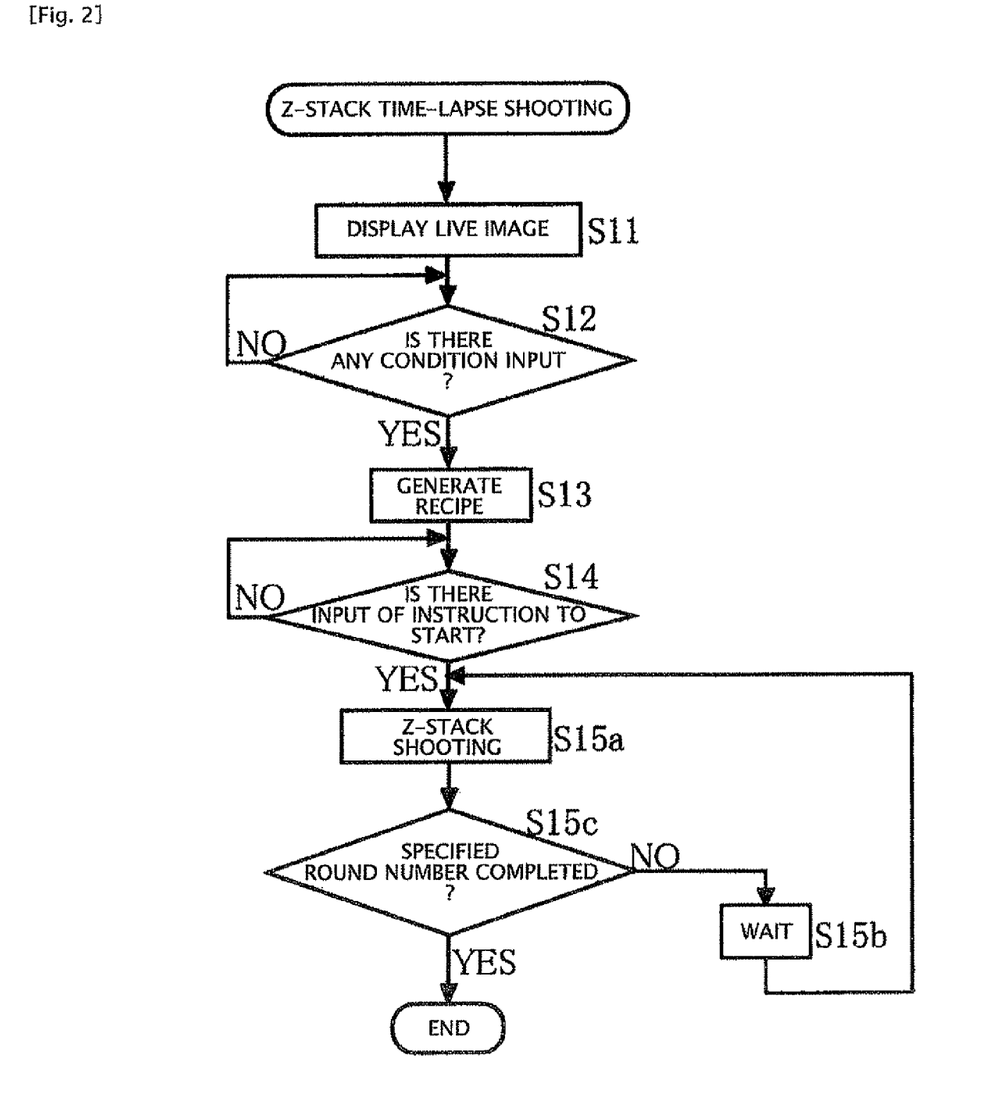
FIG. 2 is an operation flow chart of the computer 170 with regard to Z-stack time-lapse shooting.

FIG. 2 is an operation flow chart of the computer 170 with regard to Z-stack time-lapse shooting. As shown in FIG. 2, the computer 170 first sets the observation technique of the apparatus body 10 to be phase contrast observation (phase contrast observation of low magnification, to be precise) and acquires image data of a live image under that condition, then displays it on the monitor 160 (step S11).

Here, a macro view image may be displayed instead of the live image. A macro view image is an image of the incubation container 20 with a relatively large region. When acquiring image data of the macro view image, the computer 170 may acquire image data of the phase contrast image repeatedly while moving the observation point c in the incubation container 20 along the XY direction, and synthesize a plurality of acquired image data into image data of a single image. Individual image data is image data of a so-called tile image, and the synthesized image data is the image data of the macro view image.

The user determines the condition of Z-stack time-lapse shooting (interval, round number, XY coordinates of the observing point, observation technique, stack number or the like) while observing the live image displayed on the monitor 160.

Upon input by the user of the condition (YES in step S12), the computer 170 generates a recipe in which the condition is written (step S13). The recipe is stored in a hard-disk of the computer 170, for example. In the following, interval, round number, XY coordinates of the observing point, observation technique, stack number written in the recipe are referred to as "specified interval", "specified round number", "XY coordinates of a specified point", "specified observation technique", "specified stack number", respectively. For simplicity, it is assumed that the number of the specified points is only one, and that the number of the specified observation techniques is only one.

Subsequently, upon input by the user of instruction to start Z-stack time-lapse shooting (step S14), the computer 170 matches the XY coordinates of the observing point c of the incubation container 20 with the XY coordinates of the specified point, sets the observation technique of the apparatus body 10 to be the specified observation technique, and performs Z-stack shooting of the first round (step S15a).

In the first round of Z-stack shooting, the computer 170 moves the Z-coordinate of the observing point c in the incubation container 20 stepwise for the specified stack number, and acquires image data when the Z-coordinate of the observing point c is at each position. Each of the acquired image data is the image data of the slice image. In this manner, the first round of acquiring a slice image group is completed.

Subsequently, the computer 170 waits for a specified interval from the start time of the first round of shooting (step S15b), performs the second round of Z-stack shooting (step S15a) to acquire the slice image group of the second round. The second round of Z-stack shooting is performed in the same manner as the first round.

Furthermore, the above-mentioned Z-stack shooting (step S15a) is repeated until the completed round number reaches a specified round number (until YES is reached in step S15c). The slice image groups acquired as a result of all the rounds are stored in the hard-disk of the computer 170. In this manner, Z-stack time-lapse shooting is completed.

Next, operation of the computer 170 with regard to generation of a movie image file for tracking observation will be described. The operation is performed after completion of Z-stack time-lapse shooting (FIG. 2). In addition, any input of information to the computer 170 by the user is performed via the input device 180.

Figure 3:
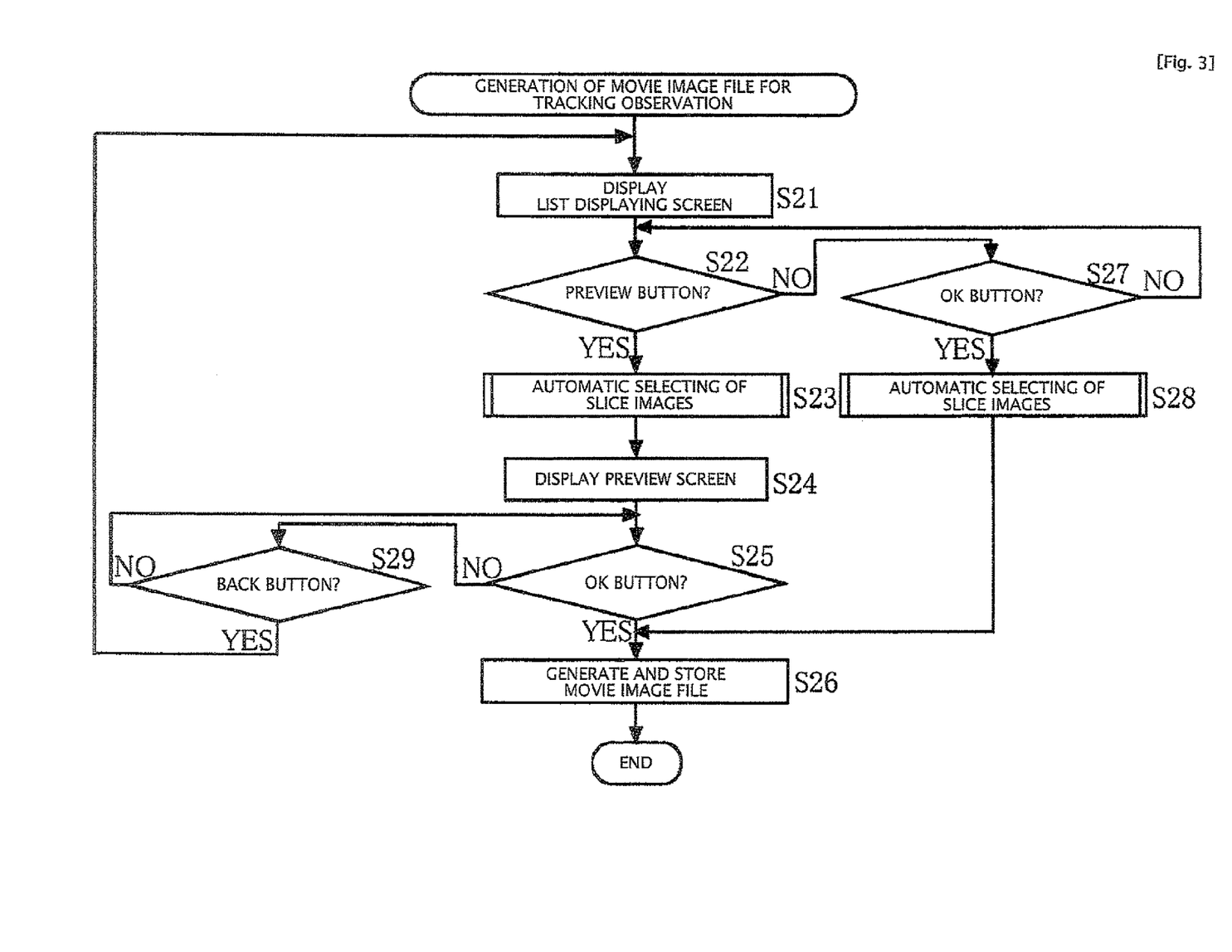
FIG. 3 is an operation flow chart of the computer 170 with regard to generation of a movie image file for tracking observation.

FIG. 3 is an operation flow chart of the computer 170 with regard to generation of a movie image file for tracking observation. As shown in FIG. 3, the computer 170 reads the slice image groups of each round acquired in the Z-stack time-lapse shooting, and displays a list displaying screen of slice images on the monitor 160 (step S21).

Figure 4:
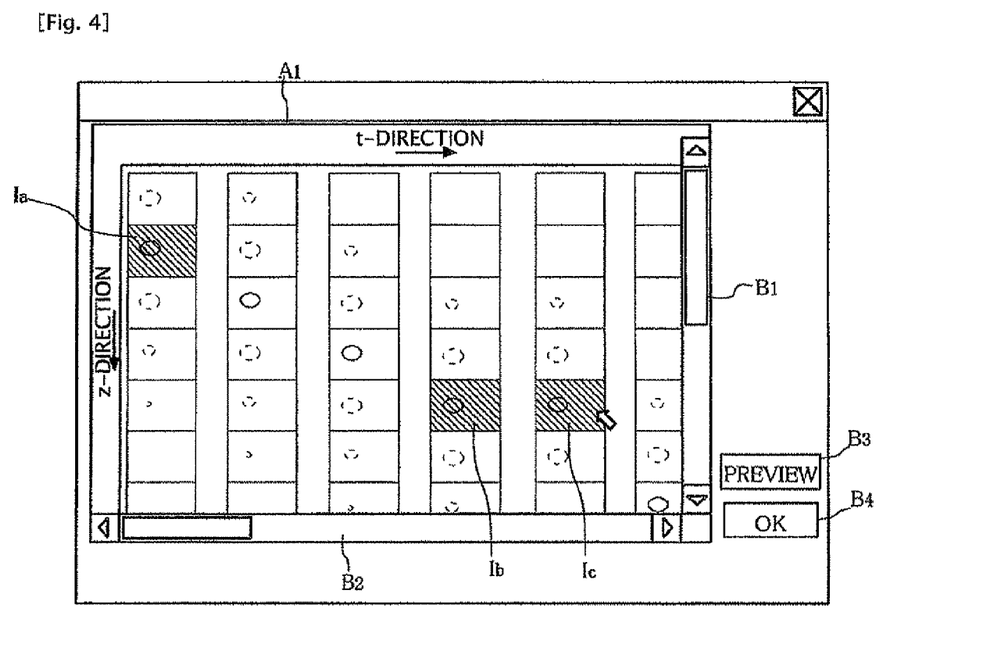
FIG. 4 is a list displaying screen.

As shown in FIG. 4, GUI images such as a preview button $B_3$, an OK button $B_4$, and a displaying area $A_1$ of slice images are arranged on the list displaying screen. Arrangement of each of the slice images on the displaying area $A_1$ depends on stack coordinates (t, z) of the slice image. Component t of the stack coordinates (t, z) corresponds to the shooting timing of the slice image, and the shooting timing t is common among the slice images of the slice image group of one round. Component z of the stack coordinates (t, z) is the slice height of the slice image, and corresponds to the Z-coordinate of the observing point c at the time of shooting.

In the displaying area $A_1$, the slice images aligned vertically is the slice image group of the same round. In the displaying area $A_1$, the slice height z is common among the horizontally aligned slice images.

When not all of the slice images fit within the displaying area $A_1$, the computer 170 arranges GUI images such as a vertical scroll bar $B_1$ or a horizontal scrolling bar $B_2$ on the periphery of the displaying area $A_1$ and, according to the user operation thereon, varies the display range of the slice images displayed on the displaying area $A_1$.

The user observes the displaying area $A_1$ with his eyes and selects slice images having focused on the specimen of his interest (e.g., particular organelle). If a mouse is used as the input device 180, the user may click on the mouse after having moved the cursor on the displaying area $A_1$ to a desired slice images. The computer 170 displays in a reversed manner, for example, the selected slice images in order to distinguish it with an unselected slice images.

Here, the rounds from which the user select a slice image do not have to be all the rounds, but at least two rounds will suffice. Therefore, comparing with the case in which slice images are selected one from each of the slice image groups of all the rounds, burden of the user is drastically reduced.

For example, FIG. 4 shows a situation where a slice image I$a$ is selected from a slice image group of the first round, a slice image I$b$ is selected from a slice image group of the fourth round, a slice image I$c$ is selected from a slice image group of the fifth round.

Subsequently, when the user selects the preview button $B_3$ (YES in step S22), the computer 170 recognizes the content of the user's selection, whereby the manual selecting operation of slice images by the user is completed.

Subsequently, the computer 170 performs automatic selecting of slice images (step S23), one by one from the rounds which were not the target of manual selecting (undecided round), based on the content of the recognized manual selecting operation. Details of the automatic selecting (step S23) will be described below.

Upon completion of the automatic selecting, the computer 170 concatenates the automatically selected slice images and manually selected slice images in the order of rounds to generate a movie image for preview and displays a preview screen on the monitor 160 (step S24). Here, the movie image for preview is concatenated after the image size of individual slice images is reduced for display.

Figure 5:
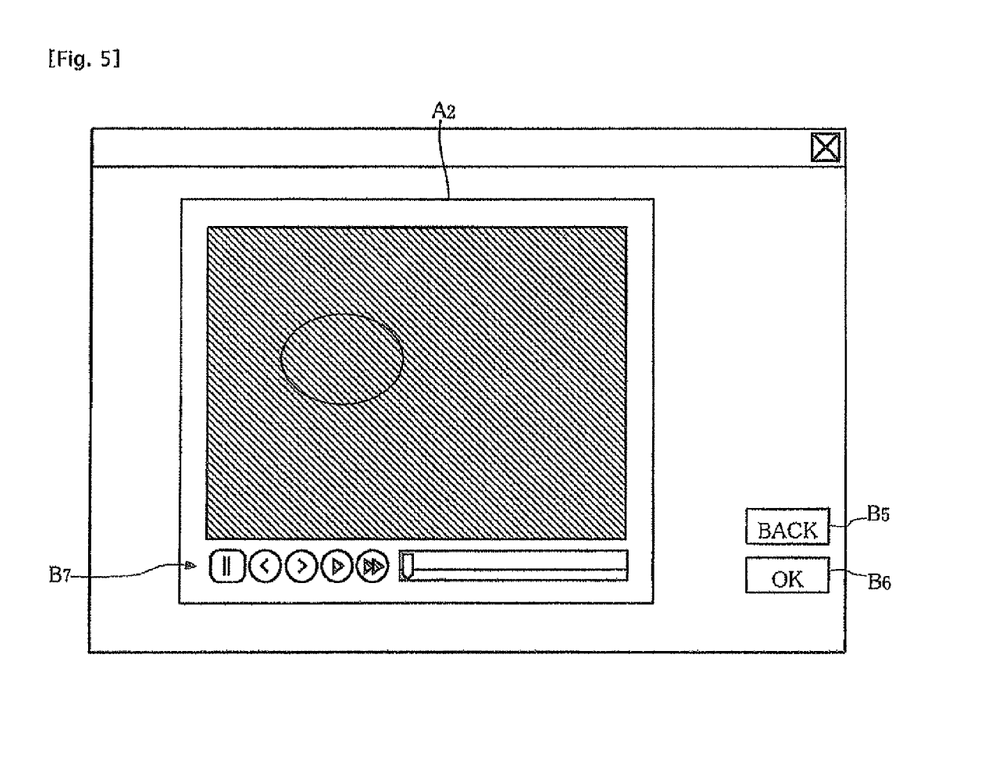
FIG. 5 is a preview screen.

As shown in FIG. 5, GUI images such as a BACK button $B_5$, an OK button $B_6$, and a control part $B_7$, and a displaying area $A_2$ of the movie image for preview are arranged on the preview screen. The user checks the movie image on the displaying area $A_2$ while operating the controlling part $B_7$, and selects the OK button $B_6$ if the movie image is satisfactory, or selects the BACK button $B_5$ if the movie image is unsatisfactory.

If the OK button $B_6$ is selected (YES in step S25), the computer 170 generates a movie image for storage having the same content as the movie image for preview, and stores it in the hard-disk as a movie image file with a format such as WMV, AVI or the like (step S26). The movie image for storage is a concatenation of individual slice images without reducing the image size thereof.

If the BACK button $B_5$ is selected (YES in step S29), the computer 170 returns to step S21 and switches the screen of the monitor 160 to a list displaying screen (FIG. 4).

Here, if the user determines that display of the preview screen is unnecessary, the user may select the OK button $B_4$ (YES in step S27) after having manually selected slice images on the list displaying screen (FIG. 4). In that case, the computer 170 immediately starts storing the movie image file (step S26) after having automatically selected the slice images (step S23).

Next, operation of the computer 170 with regard to automatic selecting of slice image will be described in detail.

Figure 6:
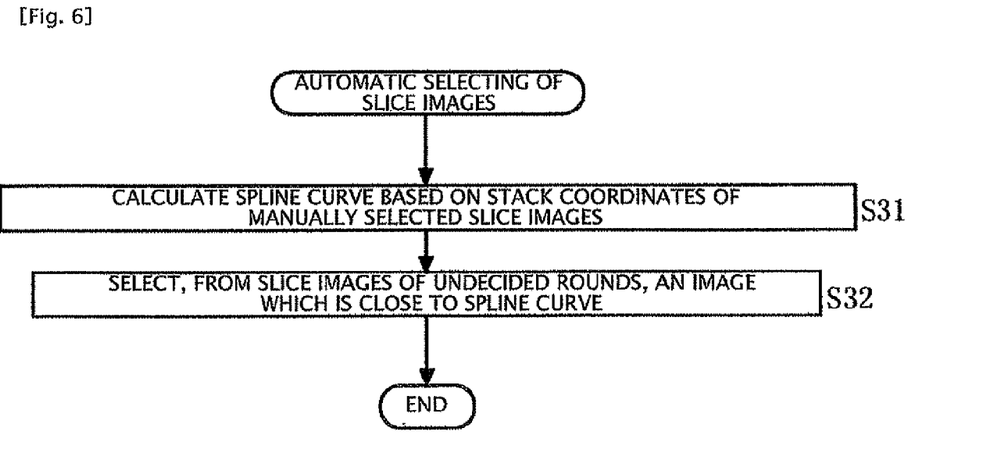
FIG. 6 is an operation flow chart of the computer 170 with regard to automatic selecting of slice images.
Figure 7:
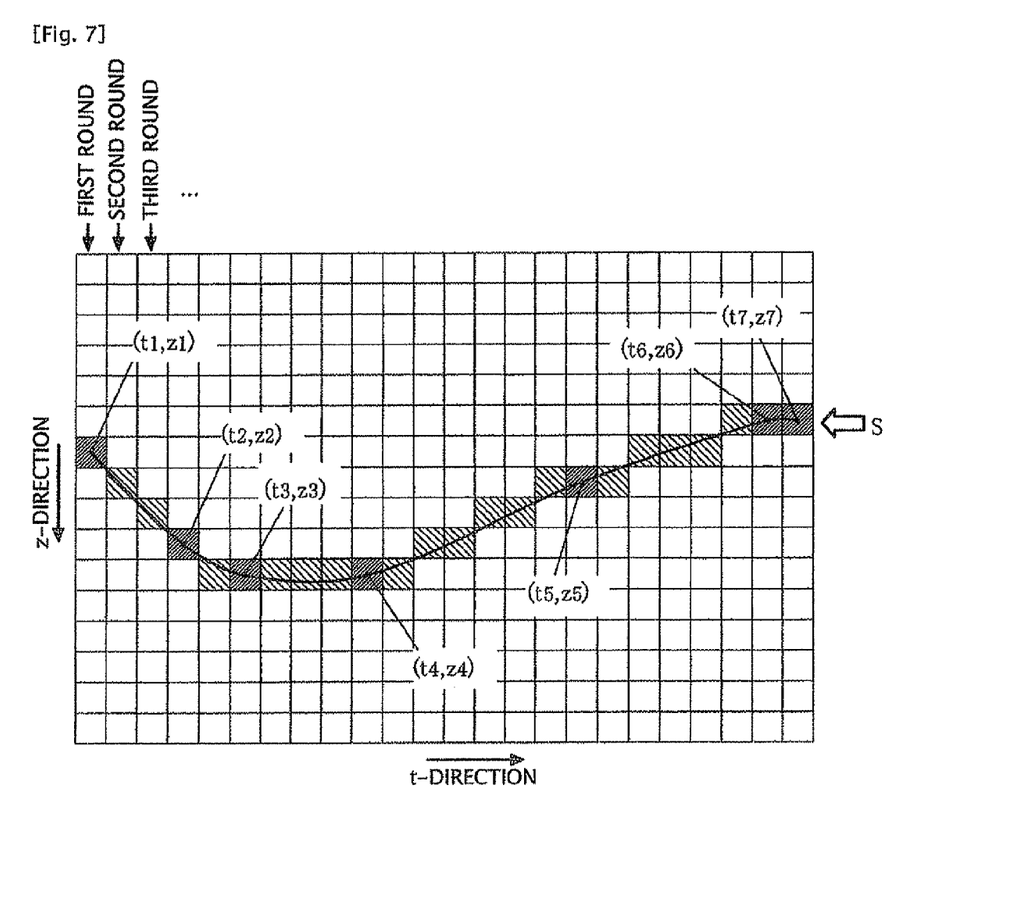
FIG. 7 is a diagram explaining automatic selecting of slice images.

FIG. 6 is an operation flow chart of the computer 170 with regard to automatic selecting of slice images, and FIG. 7 is an explanatory diagram of automatic selecting of slice images.

The plane shown in FIG. 7 is a t-z plane, in which each block indicates each of the slice images. The center position of a block indicates the stack coordinates (t, z) of each of the slice images. Here, it is assumed that seven slice images indicated by dark-hatching are manually selected. In this case, undecided rounds are the second, the third, the fifth, the seventh to ninth, the eleventh to sixteenth, and the eighteenth to twenty-second rounds. In the following, stack coordinates of the manually selected seven slice images are denoted, in the order of rounds, $(t_1, Z_1), (t_2, Z_2), \ldots, (t_7, Z_7)$.

When performing automatic selecting, the computer 170 first calculates the spline curve S which passes through each of the stack coordinates $(t_1, Z_1), (t_2, Z_2), \ldots, (t_7, Z_7)$ on the t-z plane (step S31). Typically, the spline curve S is a smooth curve. However, the spline curve S is a straight line only if the number of manually selected slice images is two.

Subsequently, the computer 170 selects slice images having stack coordinates which are close to the spline curve S, one by one from each of the slice image groups in all of the undecided rounds (step S32). In the example shown in FIG. 7, seventeen slice images indicated by light-hatching are selected, whereby automatic selecting of slice images is completed.

As shown in FIG. 7, the seventeen automatically selected slice images (light-hatched portion) smoothly interpolate the gap of manually selected seven slice images (dark hatched portion) in the t-z plane. In addition, typically, displacement along the depth direction which occurs in the organelle within the incubating cells is more often gradual than steep. Therefore, if the specimen is clearly captured in each of the manually selected slice images, it is very likely that the same specimen is also clearly captured in each of the automatically selected slice images. Thus, the movie image generated by concatenating, in the order of rounds, manually selected slice images and automatically selected slice images tracks the specimen with a high accuracy.

As a result of the above, the computer 170 of the present embodiment can maintain the tracking accuracy of the specimen to a certain degree while reducing the burden of the user.

In addition, since the computer 170 of the present embodiment sets the number of manually selected slice images to be arbitrary (arbitrary number equal to or larger than two), the user can freely increase the number of manually selected images to raise the tracking accuracy of the specimen, or decrease the number of manually selected images to raise the operating efficiency.

In addition, since the computer 170 of the present embodiment sets the target round number of manual selecting to be arbitrary, the user may find, on the list displaying screen, a position where displacement along the depth direction of the specimen is large, and increase the target round number of manual selecting nearby the position whereas decreasing the target round number of manual selecting nearby other positions. In this manner, both tracking accuracy and operating efficiency can be maximally raised.

In addition, although the computer 170 of the present embodiment determines automatic selecting based on only the stack coordinates of the slice images, graphic pattern information of the slice images may be combined with the stack coordinates of the slice images. In such a case, the computer 170 may execute the operation flow chart shown in FIG. 8, for example, instead of the operation flow chart shown in FIG. 6.

Figure 8:
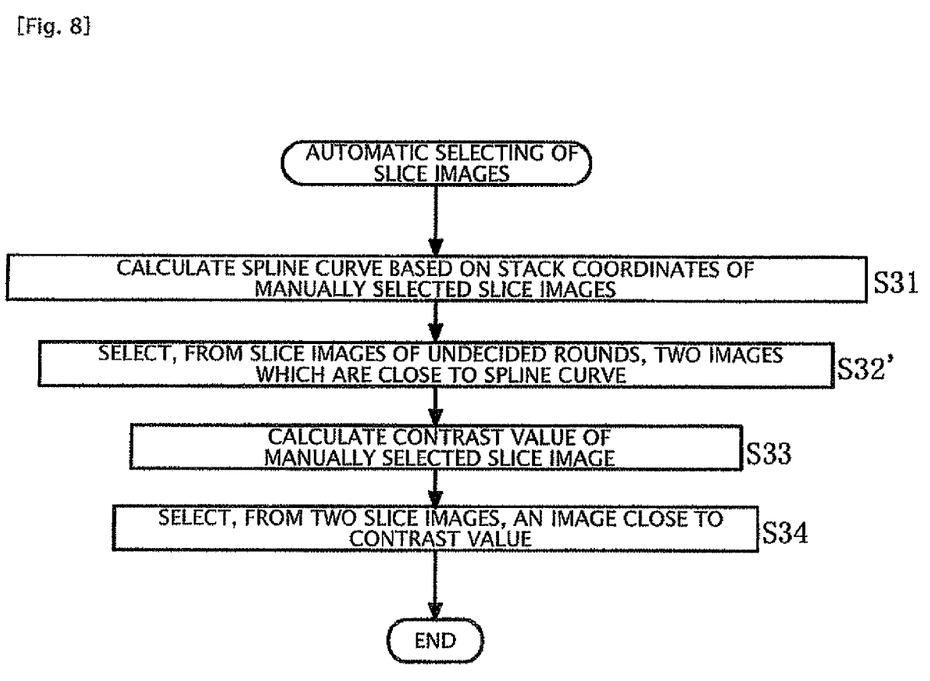
FIG. 8 is an exemplary variation of the operation flow chart shown in FIG. 6.

According to this operation flow chart, the computer 170 first calculates the spline curve S (step S31).

Subsequently, the computer 170 selects, from each of the slice image groups of undecided rounds, two slice images having stack coordinates close to the spline curve S (step S32'). The difference with step S32 exists in the number of selected slice images is set to be two per round. In this manner, two slice image options are selected for one undecided round.

The computer 170 also calculates the contrast value C of the manually selected slice images (step S33). For example, the contrast value C is obtained by averaging the contrast values of all of the manually selected slice images.

The computer 170 then selects, from slice image options of undecided rounds, a slice image option whose contrast is closer to the contrast value C (step S34). In this manner, the number of slice image options is narrowed down to one per undecided round, and the automatic selecting is completed.

As thus described, according to the operation flow chart, a slice image which has stack coordinates close from the spline curve S and also has a contrast close to the contrast value C is automatically selected.

As can be seen, if the computer 170 adds graphic pattern information (here, contrast information) of the slice images to the decision criteria of automatic selecting, it is possible to raise the tracking accuracy of the specimen without increasing the number of manually selected slice images, or decrease the number of manually selected slice images while maintaining the tracking accuracy of the specimen.

Here, although the number of slice image options is narrowed down to two in step S32' of the operation flow chart shown in FIG. 8, there may be three or more.

In addition, although the contrast value of the slice images is used as the graphic pattern information of the slice image in the operation flow chart shown in FIG. 8, edge quantity of slice image or the like may also be employed.

In addition, although the computer 170 of the above-mentioned embodiment uses a spline curve in steps S32 or S32' and step 33, other curve such as a Bezier curve may be used instead of a spline curve. Note that, a Bezier curve is a curve which passes near the stack coordinates of an automatically selected slice images, but it does not necessarily pass through the stack coordinates of an automatically selected slice images.

Note that, although a typical spline curve is a second order spline curve, a spline curve with an order equal to or higher than three such as a third order spline curve may be used in the present embodiment. Additionally, instead of using a spline curve or a Bezier curve, a curve derived by at least one of methods such as least-square method, Lagrange interpolation, or Hermite interpolation can also be used in the present embodiment.

In addition, although the computer 170 of the above-mentioned embodiment uses a spline curve in steps S32 or 32' and step S33, a polygonal line may be used instead of a spline curve. In such a case, the amount of calculation required for automatic selecting can be reduced although tracking accuracy of the specimen may slightly degrade.

In addition, although the computer 170 is used in the processing of image data acquired by the apparatus body 10 (image processing) in the microscope system of the abovementioned embodiment, an image processing apparatus (the image processing apparatus dedicated to the apparatus body 10) may be used for a part of, or the entire image processing.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus comprising:
   a storage unit which takes in a plurality of slice images acquired from a specific area of a specimen by each of Z-stack shootings performed at different time point, associates the plurality of slice images each with a shooting time point and a slice height z of the shooting time point, and stores the plurality of slice images as one of slice image groups;
   a manual selecting unit which allows a user to manually select a slice image from one of slice image groups stored by the storage unit as a representing slice image of said one of slice image groups; and
   an automatic selecting unit which automatically selects a slice image from another one of slice image groups stored by the storage unit, as a representing slice image of said another one of slice image groups, based on a selecting standard information indicating a result of the manual selection.

2. The image processing apparatus according to claim 1, wherein
   the selecting standard information includes
   stack coordinates (t, z) which indicate the shooting time point t and the slice height z of the manually selected slice image.

3. The image processing apparatus according to claim 2, wherein
   the number of said one of slice image groups is equal to or larger than two, and
   given the stack coordinates $(t_1, z_1)$, $(t_2, z_2)$, ... of two or more slice images manually selected from two or larger number of said one of slice image groups,
   the stack coordinates (t', z') of the automatically selected slice image is located near a curve defined by the coordinates $(t_1, z_1)$, $(t_2, z_2)$, ... on the t-z plane.

4. The image processing apparatus according to claim 3, wherein
   the curve is a spline curve.

5. The image processing apparatus according to claim 1, wherein
   the selecting standard information includes a graphic pattern information of the manually selected slice image.

6. A computer readable storage medium storing an image processing program, causing a computer to operate the functions of:
   a storage operation which takes in a plurality of slice images acquired from a specific area of a specimen by each of Z-stack shootings performed at different time point, associates the plurality of slice images each with a shooting time point and a slice height z of the shooting time point, and stores the plurality of slice images as one of slice image groups;
   a manual selecting operation which allows a user to manually select a slice image from one of slice image groups stored by the storage operation as a representing slice image of said one of slice image groups; and
   an automatic selecting operation which automatically selects a slice image from another one of slice image groups stored by the storage operation, as a representing slice image of said another one of slice image groups, based on a selecting standard information indicating a result of the manual selection.

7. The computer readable storage medium according to claim 6, wherein
   the selecting standard information includes
   stack coordinates (t, z) which indicate the shooting time point t and the slice height z of the manually selected slice image.

8. The computer readable storage medium according to claim 7, wherein
   the number of said one of slice image groups is equal to or larger than two, and
   given the stack coordinates $(t_1, z_1)$, $(t_2, z_2)$, ... of two or more slice images manually selected from two or larger number of said one of slice image groups,
   the stack coordinates (t', z') of the automatically selected slice image is located near a curve defined by the coordinates $(t_1, z_1)$, $(t_2, z_2)$, ... on the t-z plane.

9. The computer readable storage medium according to claim 8, wherein
the curve is a spline curve.

10. The computer readable storage medium according to claim 6, wherein the selecting standard information includes a graphic pattern information of the manually selected slice image.

11. An observing system comprising:
an observing apparatus which acquires a plurality of slice images from a specific area of a specimen by each of Z-stack shootings performed at different time point; and
the image processing apparatuses according to claim 1.

12. An observing system comprising:
an observing apparatus which acquires a plurality of slice images from a specific area of a specimen by each of Z-stack shootings performed at different time point; and
the image processing apparatuses according to claim 2.

13. An observing system comprising:
an observing apparatus which acquires a plurality of slice images from a specific area of a specimen by each of Z-stack shootings performed at different time point; and
the image processing apparatuses according to claim 3.

14. An observing system comprising:
an observing apparatus which acquires a plurality of slice images from a specific area of a specimen by each of Z-stack shootings performed at different time point; and
the image processing apparatuses according to claim 4.

15. An observing system comprising:
an observing apparatus which acquires a plurality of slice images from a specific area of a specimen by each of Z-stack shootings performed at different time point; and
the image processing apparatuses according to claim 5.

* * * * *